United States Patent [19]

Caripolti

[11] 4,215,461
[45] Aug. 5, 1980

[54] METHOD FOR INSERTING ELECTRODES INTO GLASS MELTING TANKS

[75] Inventor: Richard A. Caripolti, Lower Burrell, Pa.

[73] Assignee: PPG Industries, Inc., Pittsburgh, Pa.

[21] Appl. No.: 8,015

[22] Filed: Jan. 31, 1979

[51] Int. Cl.² ............................................. B23P 11/00
[52] U.S. Cl. ..................................... 29/432; 29/26 A; 65/171; 225/2; 225/96; 225/103; 408/59; 408/1 R
[58] Field of Search ............ 29/432, 525, 33 K, 26 A; 408/1, 59, 61; 225/2, 96, 103; 65/171; 219/421, 422

[56] References Cited

U.S. PATENT DOCUMENTS

| 3,239,324 | 3/1966 | Monks, Jr. ......................... 65/178 X |
| 3,325,890 | 6/1967 | Sandor ................................. 29/432 |

Primary Examiner—Carl E. Hall
Attorney, Agent, or Firm—Dennis G. Millman

[57] ABSTRACT

Drilling through a wall of a molten material containing vessel, such as a glass melting tank, for the purpose of inserting an electrode or the like, is facilitated by employing a drill rig in which the drill bit is carried on the end of the electrode, which in turn is mounted on reciprocating means. The reciprocating means preferably includes a fast-travel mechanism and a high-powered hydraulic cylinder acting in tandem.

7 Claims, 7 Drawing Figures

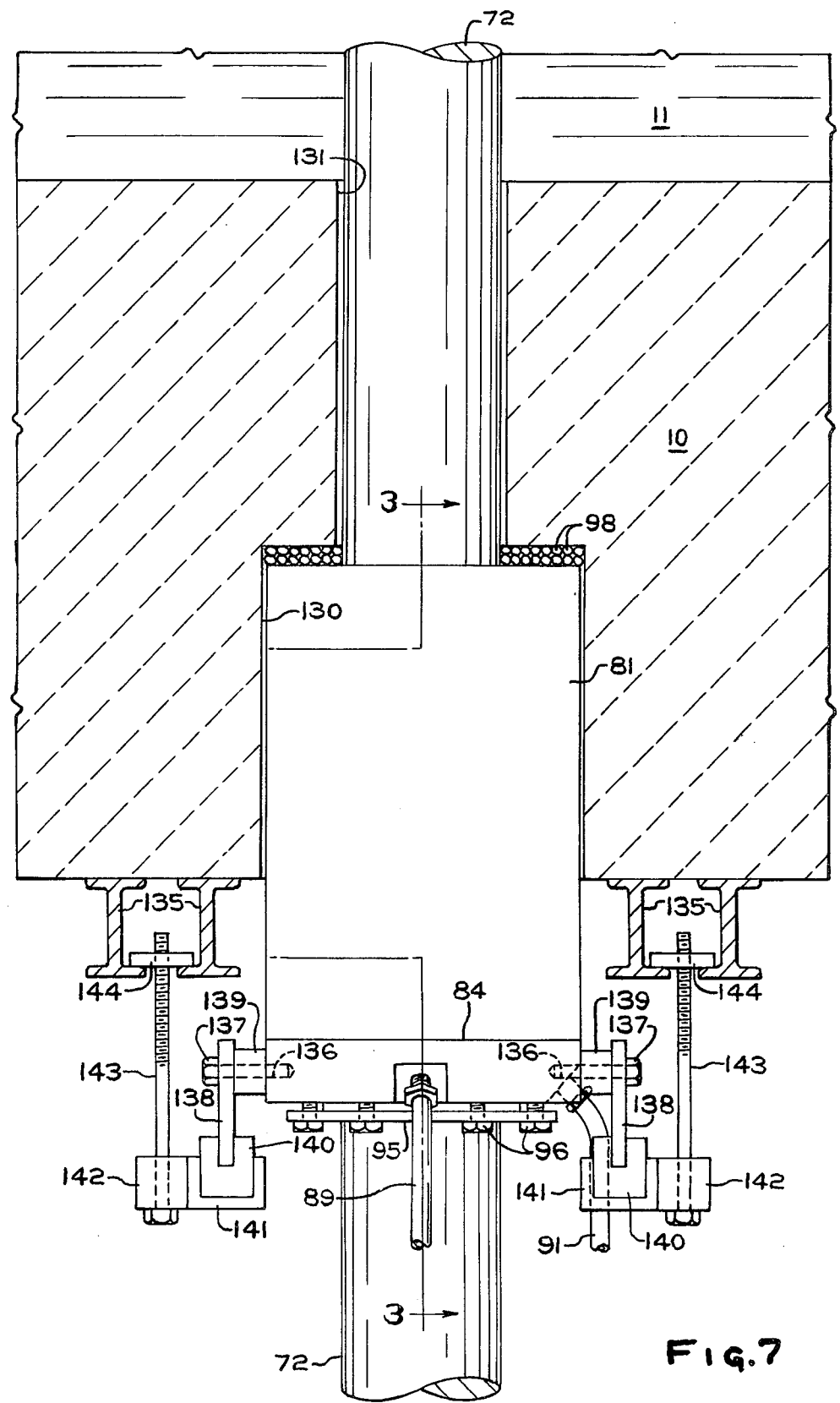

METHOD FOR INSERTING ELECTRODES INTO GLASS MELTING TANKS

BACKGROUND OF THE INVENTION

In the glass-making art the need occassionally arises to insert electrodes into an operating glass melting tank. A typical case arises when it is desired to add electrical heating to a gas-fired glass melting furnace to either boost the output of the furnace or to reduce the consumption by the furnace of fossil fuels. Or it may be desired to increase the number of electrodes in a furnace already equipped with electric heating. Additionally, when starting up a new furnace designed to include electric heating, it may be desirable to insert the electrodes after operation has begun.

Because inserting an electrode into an operating glass melting furnace entails drilling through the refractory walls or floor of a molten glass tank below the level of the melt, considerable hazard may be involved. Particularly crucial is the timing of the withdrawal of the drill and insertion of the electrode into the bore. Undue delay at this time can result in the molten glass escaping through the bore which, if uncontrolled, can be a hazard to personnel and may substantially disrupt the glass-making operation.

The typical prior art approach to inserting an electrode into a glass melting tank has been to advance a drill on a stand into the refractory until the bore extends almost through to the molten material, leaving a thin, frangible plug at the end of the bore. The drill is then retracted from the bore, the drill stand moved aside, and an electrode brought into alignment with the bore on a hoisting mechanism. When the electrode has been accurately aligned with the bore, the electrode is forced into the bore by hydraulic cylinder means and brought to bear against the plug of refractory material remaining at the end of the bore so as to break out the plug and drive the electrode into the molten material. During the critical time between the withdrawal of the drill and the insertion of the electrode, streams of water are directed into the bore to prevent a breakthrough of the molten glass. Because of the hazards associated with this critical time period, it would be highly desirable to expedite the electrode inserting step, thereby shortening this critical period.

SUMMARY OF THE INVENTION

In the present invention a unitary rig is provided for drilling and inserting an electrode into a glass melting tank, wherein the drill is carried on the end of, and in axially alignment with, the electrode. The drilling mechanism is clamped onto the end of the electrode so that when drilling is completed and the drill is withdrawn from the bore in the refractory material, the drilling mechanism can be quickly released from the electrode, thereby placing the electrode into a condition for immediate insertion into the bore. Thus, the electrode is automatically maintained aligned with the bore as drilling progresses, thereby eliminating the necessity to align the electrode during the critical time after the drill has been retracted from the bore, making the operation faster and safer. While intended primarily for use in glassmaking operations, the invention may also find utility in other arts, wherever it is desired to insert a rod-shaped member through the wall of a vessel containing a molten material.

THE DRAWINGS

FIG. 7 is a side view of the electrode of FIG. 1 after installation into the furnace floor, with the water cooled seal mounted in place.

DETAILED DESCRIPTION

This description of a preferred embodiment will deal primarily with the insertion of an electrode vertically upward through the floor of a glass melting tank, but it should be apparent that the invention is capable of operating in other locations and at other orientations.

Figure 1:
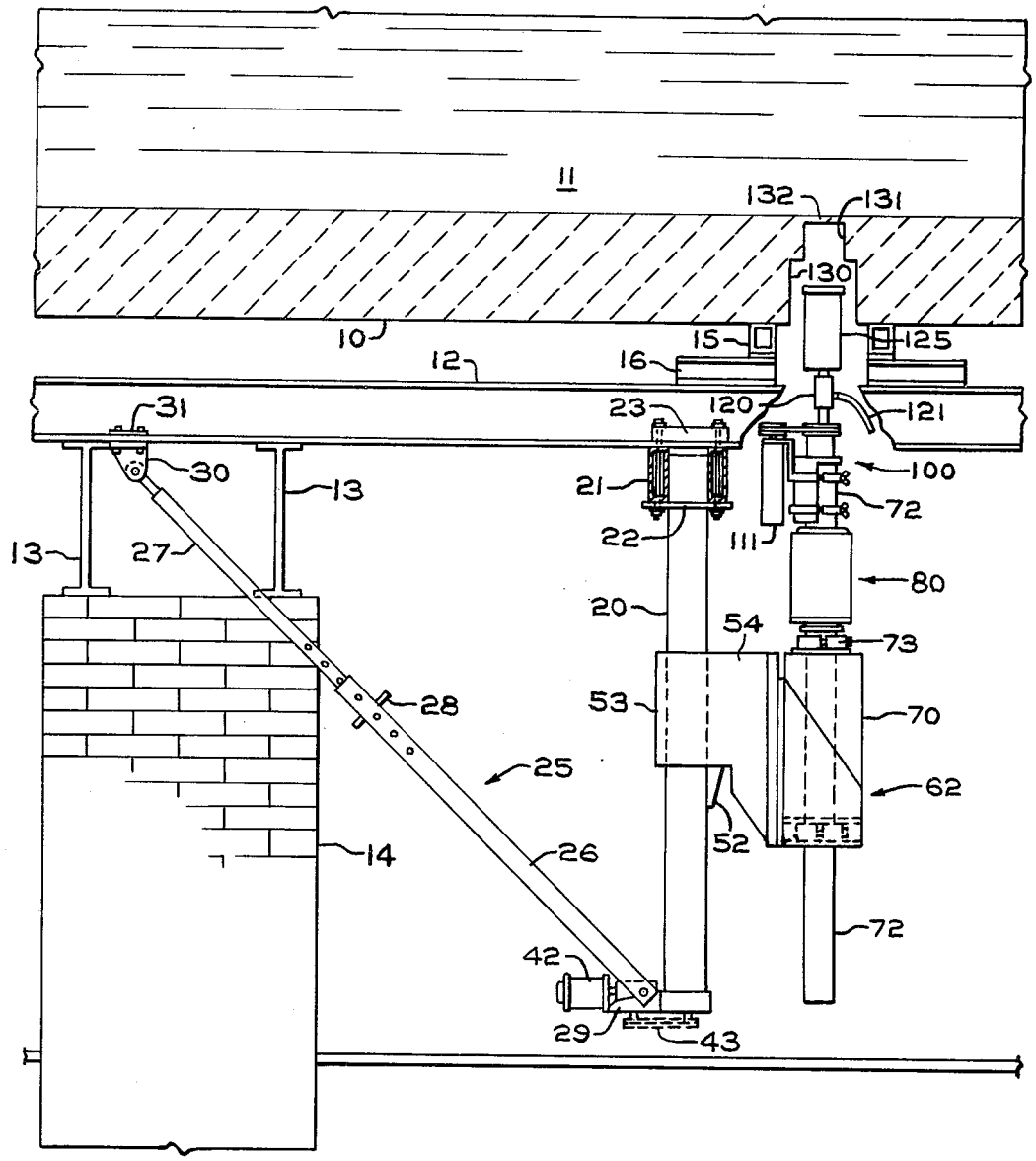
FIG. 1 is a side view of a drill and electrode inserting rig in accordance with the present invention, shown operating on the underside of a glass melting tank.

In FIG. 1 there is shown in cross-section a portion of a ceramic refractory floor 10 of a glass melting tank containing a body of molten glass 11. The structure for supporting the floor 10 is depicted in FIG. 1 as including a horizontal I-beam 12 resting on I-posts 13 and a pier 14. The refractory floor 10, as shown, rests on beam 12 by way of a large number of tubular members 15 and small I-beams 16, only a representative pair of which are shown in FIG. 1. The invention does not depend upon any particular furnace construction and, in fact, may be utilized with a wide variety of structural designs. Thus it should be understood that the structure shown in the drawings is merely for the purpose of illustrating a typical mode of utilizing the invention.

The central structural element of the drilling and installing rig is a vertically extending column 20 affixed at its upper end to a pair of horizontally extending tubular cross-braces 21. The cross-braces 21 in turn are clamped onto the undersides of several of the beams 12 by means of bolts extending between plates 22 and blocks 23 which rest on the lower flanges of I-beams 12. A strut 25 is pivotably connected to a shoe 29 at the bottom end of column 20. The strut 25 is comprised of telescoping pipe sections 26 and 27, and may be locked at various lengths of extension by means of a pin 28. The upper end of the strut is pivotably connected to a bracket 30 which is bolted through the flange of I-beam 12 to a plate 31. A second strut (not shown) may extend from shoe 29 at an angle to the first strut 25 and engage at its upper end a different I-beam or other element of the overhead structure.

The column 20 comprises part of an elevator screw mechanism. Within the column 20 is a vertically extending screw shaft 35 having an upper stub shaft 36 rotatably received in a bearing 37 and secured by a nut 38. At the lower end of the screw shaft 35 another stub shaft 40 is received in bearing 41. The screw shaft is reversably rotated by hydraulic motor 42 by way of chain drive 43. The threaded interior of an annular riser member 50 engages the threads of screw shaft 35 so as to move vertically within the column 20 as the screw shaft rotates. The annular riser 50 is enveloped by a cylindrical sheath 51. A tab 52 extends from one side of the annular riser 50 through a slot through one side of the column 20 extending along the length of the column. The tab 52 engages the underside of a sleeve 53 adapted to slide on the outside of column 20 and a mounting bracket 54 on one side of the sleeve. The otherwise exposed portions of the column 20 above and below sleeve 53 may be protected by bellows sections 55 and 56.

Figure 5:
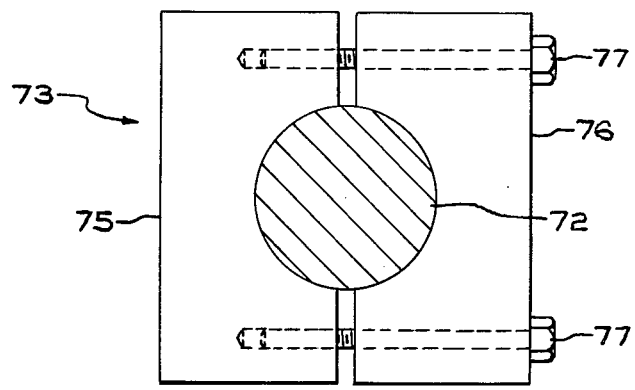
FIG. 5 is a cross-sectional view taken along line 5—5 in FIG. 2, showing an electrode clamp.

Flanges 60 on bracket 54 are bolted to opposing flanges 61 on a carriage 62 adapted to receive a hydraulic cylinder 70. The carriage 62 includes side stiffeners 63, a floor 64 upon which the hydraulic cylinder 70 rests and a sub-floor 65. A rod-shaped electrode 72 which is to be installed is shown extending through and beyond both ends of the hydraulic cylinder 70 and through floor 64 and sub-floor 65, both of which are notched so that the cylinder and electrode may be slid horizontally into place on the carriage 62. A clamp 71 which is received between the floor 64 and the sub-floor 65 may be tightened around the electrode 72 so as to fasten the electrode to the carriage when vertical movement is provided by the elevator screw mechanism. On the upper side of the cylinder 70 another clamp 73 engages the electrode. The clamp 73 bears against the top of piston head 74. Details of clamp 73, which may be identical to clamp 71, are shown in the top view of FIG. 5. There, it may be seen that the clamp includes two C-shaped sections 75 and 76 joined together by means of bolts 77. In order to provide greater flexibility in aligning the electrode with the intended location of insertion, spacers (not shown) may be placed between flanges 60 and 61 to space the carriage 62 farther from the elevator screw column 20.

The electrode 72 typically may be a solid rod of molybdenum, about 4 inches (10 centimeters) in diameter and about 6 feet (1.8 meter) long. The electrode may be assembled from a plurality of threaded sections.

Figure 2:
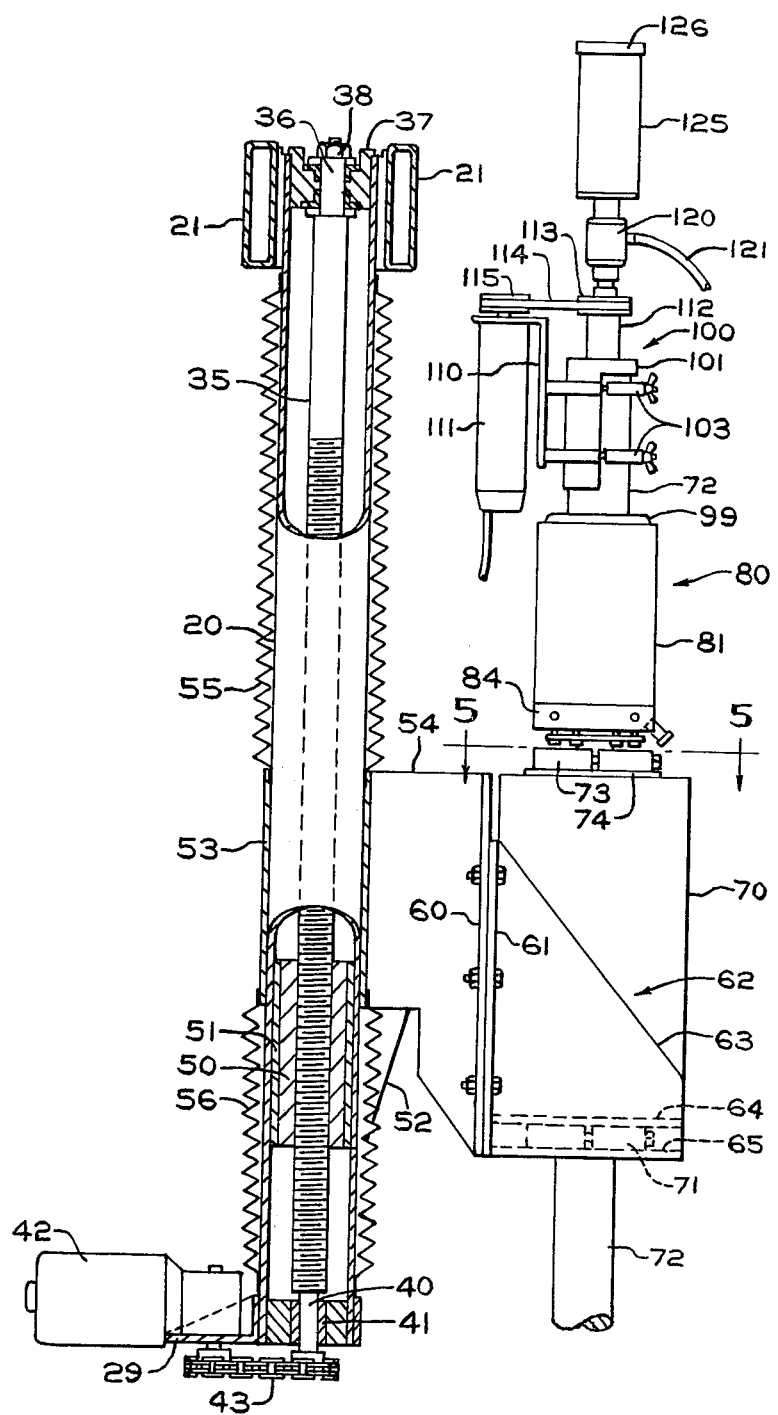
FIG. 2 is an enlarged view, partly broken away, of the drilling and inserting rig of FIG. 1, showing details of the elevator mechanism.
Figure 3:
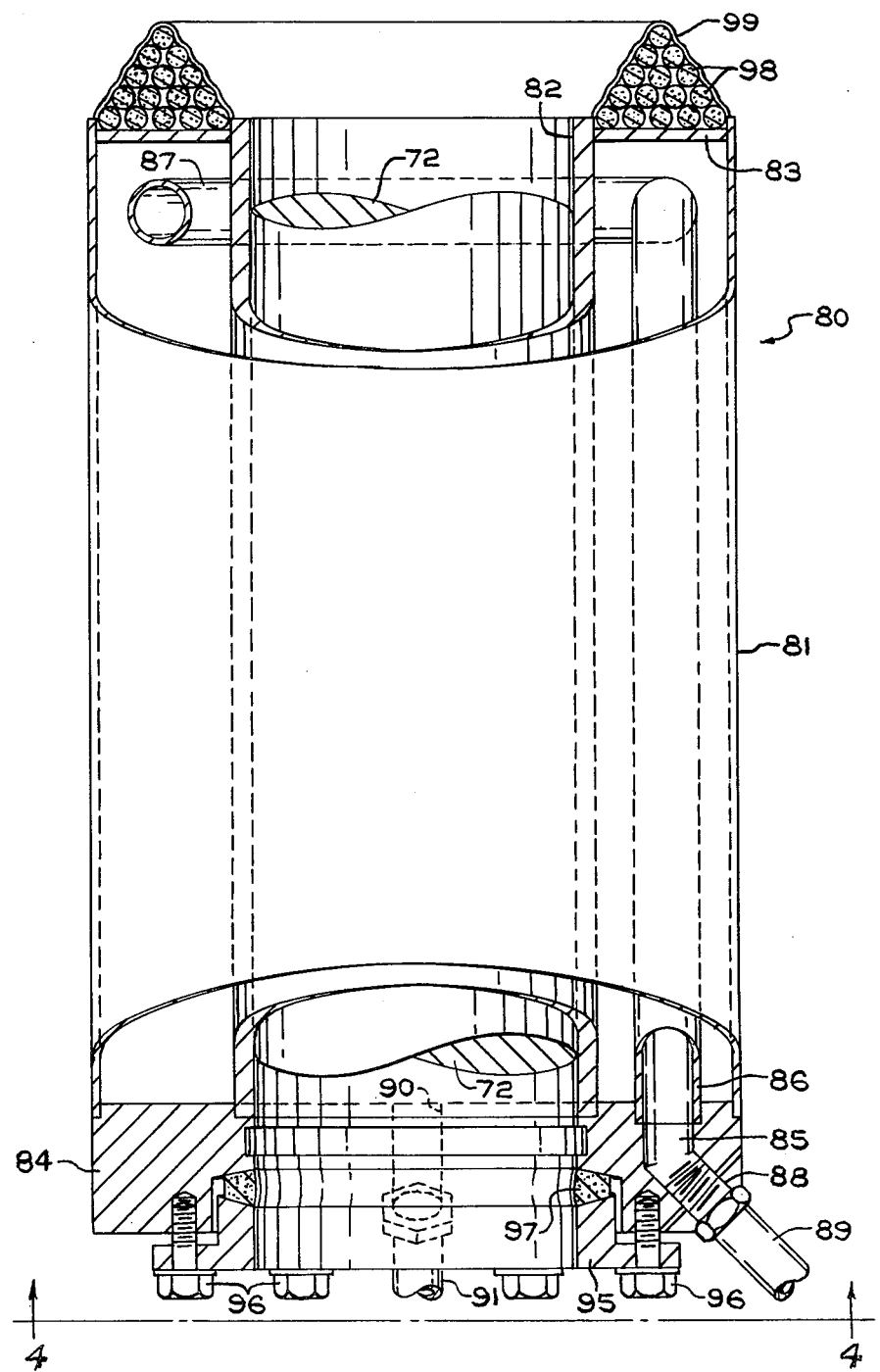
FIG. 3 is a further enlargement, partly broken away, of the water cooled sealing arrangement employed with the electrode installation shown in FIGS. 1 and 2.

When the rig is in the drilling mode as shown in FIGS. 1 and 2, the electrode may also carry an annular water cooler 80 which is employed to seal the bore in the final installation of the electrode. The water cooler 80 may be loosely carried on the electrode 72 above the clamp 73. Reference may be had to FIG. 3 for details of the water cooler. The chief structural components of the water cooler include a cylindrical outer casing 81, a cylindrical inner casing 82, a circular upper end wall 83 and a circular bottom piece 84, which together form an enclosed annular space surrounding the electrode 72. The bottom piece 84 is provided with a bore 85 which serves as a water inlet to a pipe 86 which extends vertically within the water cooler to a point near the upper end of the water cooler, where it terminates in a semicircular pipe section 87. A spiral flow of water is thus induced within the water cooler, with the cooler, incoming stream of water being discharged at the upper end of the water cooler, which will become subjected to the most severe temperature conditions. Connection to a water supply is made by way of a threaded bore section 88 and a supply conduit 89. Water exits from the cooler through a drain hole 90 bored through the bottom piece 84 in communication with a drain conduit 91.

Figure 4:
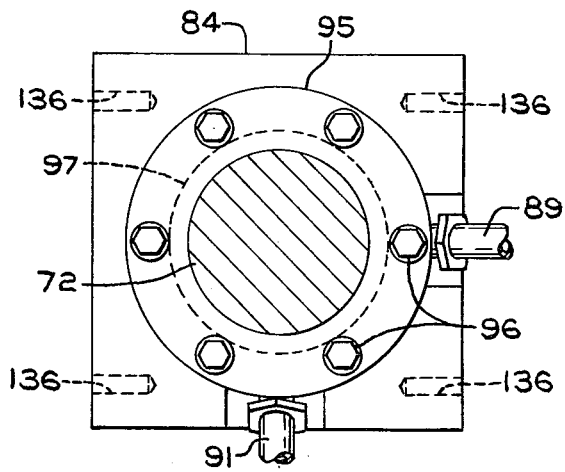
FIG. 4 is a bottom view of the water cooled seal taken along line 4—4 in FIG. 3.

A seal between the water cooler and the electrode is provided in the final stages of installation by means of a packing gland including a packing gland ring 95 fastened to the underside of bottom piece 84 by means of bolts 96. Packing 97 may be of the asbestos-graphite-metal wire type intended for use at 1000° F. (540° C.). Details of the underside of the water cooler including the packing gland may be seen in FIG. 4.

At the upper end of the water cooler, sealing material is provided for sealing the water cooler against the furnace bottom. This sealing material may include a number of turns of heat-resistant rope 98 covered with an application of cement 99. The heat-resistant rope may be, for example, one-half inch (1.27 centimeters) diameter Fiberfrax rope (a product made of alumina-silica fibers; sold by the Carborundum Co.) saturated in a slurry of sodium silicate and Zircon 716 cement (a cement comprising approximately 62% by weight $ZrO_2$, 35% $SiO_2$, and 2% alkalies; sold by Chas. Taylor Co.). After the rope is wound around the top of the water cooler, additional Zircon 716 cement may be applied. To protect the sealing material from water and debris during the drilling operation, it may covered by plastic film secured in place with tape (not shown).

Figure 6:
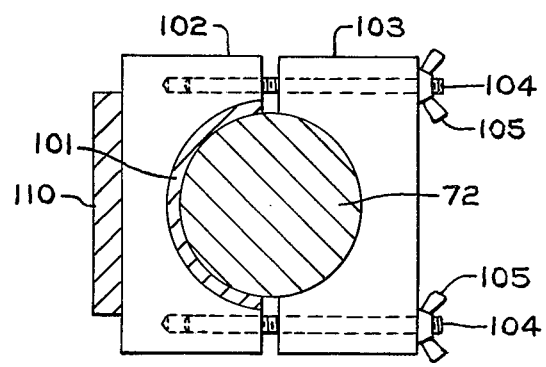
FIG. 6 is a top cross-sectional view through the mounting bracket for the drilling mechanism.

Referring again to FIG. 2 there is shown a drilling head 100 affixed to the upper end of the electrode 72. A base 101 for the drilling head rests on the end of the electrode and has a downwardly depending skirt section extending along one side of the electrode. The base 101 is clamped onto the electrode by means of C-clamps 102 and 103 (see FIG. 6), threaded rods 104, and wing nuts 105. On one side of the C-clamps 102 there is affixed a motor bracket 110 which holds a hydraulic motor 111. The motor 111 drives the drill through a belt 114 and wheels 113 and 115. The belt-driven wheel 113 rests on a bearing 112 carried on the upper end of base 101. From wheel 113, the rotary drive for the drill passes through a swivel connector 120, to which cooling water is supplied through a conduit 121. The cooling water is fed into the hollow interior of the cylindrical drill bit 125. The open top of the drill bit is ringed by abrasives 126.

When the above-described rig is used to insert an electrode through the floor of an operating glass melting tank, the first step is to locate the rig roughly and hang the rig under the tank without the hydraulic cylinder 70 or the electrode 72 in place. At this time the upper end of the screw column 20 and the struts 25 are bolted in an approximate location to the support structure of the melting tank. The electrode 72 is inserted into the hydraulic cylinder 70 while both are in a horizontal position. When clamps 71 and 73 have been tightened on the electrode, the electrode and cylinder are hoisted and turned to extend vertically and are slid into place on the carriage 62, to which the cylinder is then bolted. The water cooler 80 is filled with water while held in an inverted position. With the water supply being maintained continuously, the water cooler is turned right side up, and the packing 97 and the sealing material 98 and 99 are inserted into the water cooler. The water cooler is then placed over the electrode and held in place temporarily by slightly tightening the packing gland 95. The drilling head 100 is slipped onto the top of the electrode and clamped into place by tightening wing nuts 105. Final positioning of the rig may take place at this time and the bolts securing the screw column 20 and the struts 25 tightened.

The rig is now ready for drilling. As shown in FIG. 1, a large diameter counter-bore 130 is first drilled part way through the furnace bottom 10 so as to accommodate the upper portion of water cooler 80. A smaller diameter bore 131 is then drilled further into the refractory bottom for the electrode, leaving only a thin plug 132 which may, for example, be about one-half inch (1.3 centimeters) thick. Rapid vertical motion of the drill is attained with the vertical screw mechanism to bring the drill into position against the refractory surface. As the drill bit 125 rotates, slow, steady advancement upwardly is provided by the hydraulic cylinder 70. The bottom electrode clamp 71 is loosened before the hydraulic cylinder is actuated. When drilling has progressed sufficiently close to the molten glass-refractory interface, the drill is rapidly retracted by the screw column and the bore is flushed with water continuously. The drilling head is removed from the electrode by simply unscrewing the wing nuts 105, and the electrode is then immediately ready to be inserted into the bore. The electrode is advanced upwardly by the fast travel screw mechanism until the electrode is just touching the surface of the plug 132. The hydraulic cylinder is then activated to push the plug and the electrode into the tank. As the electrode moves into the tank, the water cooler is raised into position within the counter-bore 130. When the electrode begins to slip through the water cooler, the electrode advance may be stopped, and the water cooler affixed to the surrounding furnace structure in a manner such as that shown in FIG. 7.

In FIG. 7, the electrode 72 has broken through to the molten glass 11, and the water cooler 80 has been raised into the counter-bore 130 so that sealing material 98 has become compressed. The water cooler must be secured against vertical movement, but the precise arrangement will depend upon the particular surrounding structure encountered in a particular melting tank. FIG. 7 shows an arrangement which may be used with one type of structure which may be encountered. In this case, a plurality of small I-beams 135 lend themselves to supporting the water cooler. Four threaded bores 136 (see also FIG. 4) in bottom piece 84 of the water cooler are provided for bolts 137. Each of the bolts 137 passes through a spacer block 139 and a downwardly extending plate 138. The lower end of each plate 138 is received in a block of electrically insulating material 140, such as Transite (a pressed calcium silicate cement product containing inorganic reinforcing fibers; sold by Johns-Manville Co.). Each of the insulating blocks 140 is, in turn, held by a bracket 141 having a laterally extending tab 142 bored to receive a vertically extending long bolt 143. Each of the long bolts 143 is threaded into a plate 144 resting between the flanges of a pair of the small I-beams 135. As the bolts 143 are tightened, the sealing material 98 is compressed and the water cooler is secured firmly in place.

After the water cooler is secured, the electrode 72 is now advanced beyond its intended depth of immersion into the melt, e.g., about 6 inches (15 centimeters), and then retracted to its intended depth so as to coat the electrode with glass in the space between the tank bottom and the water cooler to protect the electrode from oxidation. When the electrode is set at its final immersion depth, the packing gland ring 95 is tightened by tightening bolts 96. Suitable electrical connectors may then be affixed to the lower end of the electrode so as to place the electrode into an electrical heating circuit.

Variations and modifications as are known to those of ordinary skill in the art may be resorted to without departing from the spirit and scope of the invention as defined by the following claims.

I claim:

1. Method of installing a rod-shaped electrode in a vessel containing molten glass, comprising:
    aligning the longitudinal axis of the electrode with an intended center line of drilling through a wall of the vessel below the level of the molten glass;
    affixing the electrode in said aligned relationship to reciprocating means adapted to provide movement of the electrode along said center line;
    fastening rotary drilling means to an end of the electrode with the axis of rotation of the drilling means coincident with the longitudinal axis of the electrode;
    advancing the electrode and the drilling means by said reciprocating means along said center line as the drilling means bores into the wall of the vessel; and
    when the bore has reached a predetermined depth, retracting the drilling means from the bore, removing the drilling means from the electrode, and advancing the electrode into the bore by said reciprocating means.

2. The method of claim 1 wherein the wall into which the drilling means bores is a ceramic refractory material.

3. The method of claim 2 wherein said boring takes place along a vertical line through a floor of a glass melting tank.

4. The method of claim 1 or 3 wherein said boring is halted slightly before said wall is penetrated, and the advancement of the electrode into the bore fractures the remaining material at the end of the bore.

5. The method of claim 1 wherein the retracting of the drilling means from the bore and the advancement of the electrode into the bore are carried out at rapid rates relative to the rate of advancement during boring.

6. The method of claim 5 wherein the advancement of the electrode into the bore at said relatively rapid rate is followed by advancement of the electrode into the bore at a slower rate.

7. The method of claim 6 further including bringing the drilling means into close proximity to the wall prior to boring by moving the electrode and drilling means along said center line by means of said reciprocating means at a rapid rate relative to the rate of advancement during boring.

* * * * *